United States Patent
Ha et al.

(10) Patent No.: US 9,064,346 B2
(45) Date of Patent: Jun. 23, 2015

(54) HIERARCHICAL BASED 3D IMAGE PROCESSOR, METHOD, AND MEDIUM

(75) Inventors: In Woo Ha, Seongnam-si (KR); Myung Jin Eom, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1243 days.

(21) Appl. No.: 12/289,026

(22) Filed: Oct. 17, 2008

(65) Prior Publication Data

US 2009/0295805 A1    Dec. 3, 2009

(30) Foreign Application Priority Data

Jun. 2, 2008  (KR) ........................ 10-2008-0051707

(51) Int. Cl.
  *G06T 15/50*  (2011.01)
  *G06T 15/06*  (2011.01)
  *G06T 15/60*  (2006.01)
  *G06T 15/80*  (2011.01)

(52) U.S. Cl.
  CPC ................. *G06T 15/50* (2013.01); *G06T 15/60* (2013.01); *G06T 15/80* (2013.01); *G06T 15/506* (2013.01); *G06T 15/06* (2013.01)

(58) Field of Classification Search
  CPC ....... G06T 15/506; G06T 15/50; G06T 15/80; G06T 15/60; G06T 15/06
  USPC ......... 345/419, 421, 422, 423, 426, 427, 531, 345/582
  See application file for complete search history.

(56) References Cited

U.S. PATENT DOCUMENTS

| | | | | |
|---|---|---|---|---|
| 5,933,146 A * | 8/1999 | Wrigley | ................... | 345/420 |
| 5,973,699 A * | 10/1999 | Kent | ..................... | 345/419 |
| 6,028,608 A * | 2/2000 | Jenkins | ................... | 345/619 |
| 6,057,847 A * | 5/2000 | Jenkins | ................... | 345/422 |
| 6,111,582 A * | 8/2000 | Jenkins | ................... | 345/421 |
| 6,429,864 B1 * | 8/2002 | Schwarzer | .............. | 345/419 |
| 6,445,391 B1 * | 9/2002 | Sowizral et al. | ........... | 345/421 |
| 6,466,227 B1 * | 10/2002 | Pfister et al. | .............. | 345/619 |
| 6,597,359 B1 * | 7/2003 | Lathrop | ................... | 345/440 |
| 7,145,562 B2 * | 12/2006 | Schechter et al. | ........... | 345/420 |
| 7,164,420 B2 * | 1/2007 | Ard | ......................... | 345/423 |
| 7,250,948 B2 * | 7/2007 | Hayes et al. | .............. | 345/421 |
| 8,174,524 B1 * | 5/2012 | Laur | ....................... | 345/419 |
| 2004/0125103 A1 * | 7/2004 | Kaufman et al. | ........... | 345/419 |
| 2005/0017971 A1 * | 1/2005 | Ard | ......................... | 345/423 |

(Continued)

FOREIGN PATENT DOCUMENTS

KR    10-0791411    1/2008

OTHER PUBLICATIONS

Korean Office Action dated May 16, 2014 from Korean Patent Application No. 10-2008-0051707, 6 pages.

*Primary Examiner* — Abderrahim Merouan
(74) *Attorney, Agent, or Firm* — NSIP Law

(57) ABSTRACT

A three dimensional (3D) image processing using ray tracing. The 3D image processing includes checking for a collision of rays, each ray respectively corresponding to a pixel of a plurality of pixels included in an image, and generating a plurality of corresponding ray trees to a first depth; and checking a collision of rays, each ray respectively corresponding to at least one pixel of the plurality of pixels, and updating a ray tree corresponding to the at least one pixel to a second depth.

24 Claims, 11 Drawing Sheets

(56) References Cited

U.S. PATENT DOCUMENTS

| | | | |
|---|---|---|---|
| 2007/0024615 A1* | 2/2007 | Keller et al. | 345/421 |
| 2007/0206008 A1* | 9/2007 | Kaufman et al. | 345/424 |
| 2008/0143720 A1* | 6/2008 | Elmquist | 345/426 |
| 2008/0174600 A1* | 7/2008 | Xie | 345/426 |
| 2008/0180441 A1* | 7/2008 | Brown et al. | 345/427 |
| 2008/0260271 A1* | 10/2008 | Lundstrom et al. | 382/239 |
| 2010/0053162 A1* | 3/2010 | Dammertz et al. | 345/426 |
| 2010/0060634 A1* | 3/2010 | Wald et al. | 345/420 |

\* cited by examiner

HIERARCHICAL BASED 3D IMAGE PROCESSOR, METHOD, AND MEDIUM

CROSS-REFERENCE TO RELATED APPLICATIONS

This application claims the benefit of Korean Patent Application No. 10-2008-0051707, filed on Jun. 2, 2008, in the Korean Intellectual Property Office, the disclosure of which is incorporated herein by reference.

BACKGROUND

1. Field

One or more embodiments of the present invention relate to a hierarchical based three-dimensional (3D) image processor, method, and medium, and more particularly, to a hierarchical based 3D image processor, method, and medium performing the hierarchical based processing with ray tracing.

2. Description of the Related Art

Three-dimensional (3D) image processing can be used for generating two-dimensional (2D) images, for example, similar to 2D physical images displayed on a television, a monitor, and the like. Such 3D image processing may represent a virtual 3D space where any of a number of virtual 3D objects are positioned, and simulate images as if they were being viewed from an observer's viewpoint according to a relationship between a corresponding virtual ray and the virtual 3D object.

The 3D image processing may be divided into processes that model the virtual 3D space and the virtual 3D object and processes that extract images obtained when the modeled virtual 3D object is projected from the observer's viewpoint. The process for extracting images projected, from the observer's viewpoint, from the virtual 3D object may be referred to as 3D rendering.

Ray tracing is one example technique for the 3D rendering.

In the physical world, rays of light from at least one light source may be reflected and/or refracted as they strike an object, resulting in changes in direction and/or intensity of the rays. These changes are thus observed as an aggregate of at least one changed ray, from the observer's viewpoint.

Ray tracing may be a scheme for inversely tracing a trajectory of a ray in the physical world, and trace a process in which rays are generated from the observer's viewpoint; a generated ray may be reflected and/or refracted when striking the object to thereby cause a change in the ray. Ray tracing may, thus, trace, for each set pixel making up a plane display at the observer's viewpoint, changes in the at least one ray generated from each of the pixels to thereby identify the appropriate color to be displayed for each of the pixels.

In general, the number of rays and objects may be increased in order to provide a more realistic 3D image using ray tracing, and thus 3D rendering using ray tracing may require a significantly large amount of computations.

In addition, in conventional ray tracing, when a predetermined termination condition is satisfied, with respect to tracing of a specific pixel, the tracing process is terminated and a subsequent pixel may be traced, i.e., there may be no correlation between separate tracing processes.

SUMMARY

An aspect of one or more embodiments of the present invention provide a hierarchical based three-dimensional (3D) image processor, method, and medium that performs ray tracing based on a priority of processing operations, depending on a Level of Detail (LOD) of a corresponding ray, in order to improve efficiency of 3D rendering using ray tracing.

An aspect of one or more embodiments of the present invention also provide a hierarchical based 3D image processor, method, and medium that displays a result image in real time according to a process of ray tracing.

To achieve the above and/or other aspects and advantages, one or more embodiments of the present invention set forth a three dimensional (3D) image processing method using ray tracing, the 3D image processing method including generating a plurality of ray trees to a first depth, each ray tree corresponding to a respective pixel of a plurality of pixels for an image, by checking a collision of rays, each ray corresponding to the respective pixel of the plurality of pixels, and selectively updating at least one generated ray tree, of the generated plurality of ray trees to the first depth, to a second depth by checking a collision of corresponding rays derived from the respective ray used to generate the corresponding at least one generated ray tree to the first depth.

To achieve the above and/or other aspects and advantages, one or more embodiments of the present invention set forth a computer-readable recording medium having stored thereon instructions to implement a 3D image processing method using ray tracing, the instructions including an instruction set of generating a plurality of ray trees to a first depth, each ray tree corresponding to a respective pixel of a plurality of pixels for an image, by a comprised instruction set of checking a collision of rays, each ray corresponding to the respective pixel of the plurality of pixels, and an instruction set of selectively updating at least one generated ray tree, of the generated plurality of ray trees to the first depth, to a second depth by a comprised instruction set of checking a collision of corresponding rays derived from the respective ray used to generate the corresponding at least one generated ray tree to the first depth.

To achieve the above and/or other aspects and advantages, one or more embodiments of the present invention set forth a computer-readable recording medium having stored thereon instructions to implement a 3D image processing method using ray tracing, the instructions including an instruction set of generating a plurality of ray trees to a first depth, each ray tree corresponding to a respective pixel of a plurality of pixels for an image, by a included instruction set of collision of rays, each ray corresponding to the respective pixel of the plurality of pixels selectively performing, and an instruction set of recursively performing an instruction set which selects a first leaf node based on a priority of leaf nodes of the plurality of ray trees, checks a collision of rays corresponding to a pixel corresponding to the first leaf node, as a first pixel, and updates a ray tree corresponding to the first pixel, as an updated first ray tree.

To achieve the above and/or other aspects and advantages, one or more embodiments of the present invention set forth a computer-readable recording medium having stored thereon instructions to implement a 3D image processing method using ray tracing, the instructions including an instruction set of extracting first ray data from a plurality of pieces of ray data, stored in a storage unit, based on a predetermined priority of the plurality of pieces of ray data, and an instruction set of storing data corresponding to a reflection ray and data corresponding to a transmission ray in the storage unit, the reflection ray and the transmission ray being generated by further checking a collision based on the first ray data extracted based on the priority.

To achieve the above and/or other aspects and advantages, one or more embodiments of the present invention set forth a computer-readable recording medium having stored thereon instructions to implement a 3D image processing method, the instructions including an instruction set of providing a 3D image of a first level using a 3D rendering scheme with a plurality of quality levels, and an instruction set of selectively providing a 3D image of a second level after providing the 3D image of the first level.

To achieve the above and/or other aspects and advantages, one or more embodiments of the present invention set forth a method of rendering 3D image data through ray tracing, comprising selectively performing different depths of collision checking according to determined ray tree depth priorities for different pixels and/or different leaf tree nodes for a result image after performing an equal depth collision checking of all pixels in the result image.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
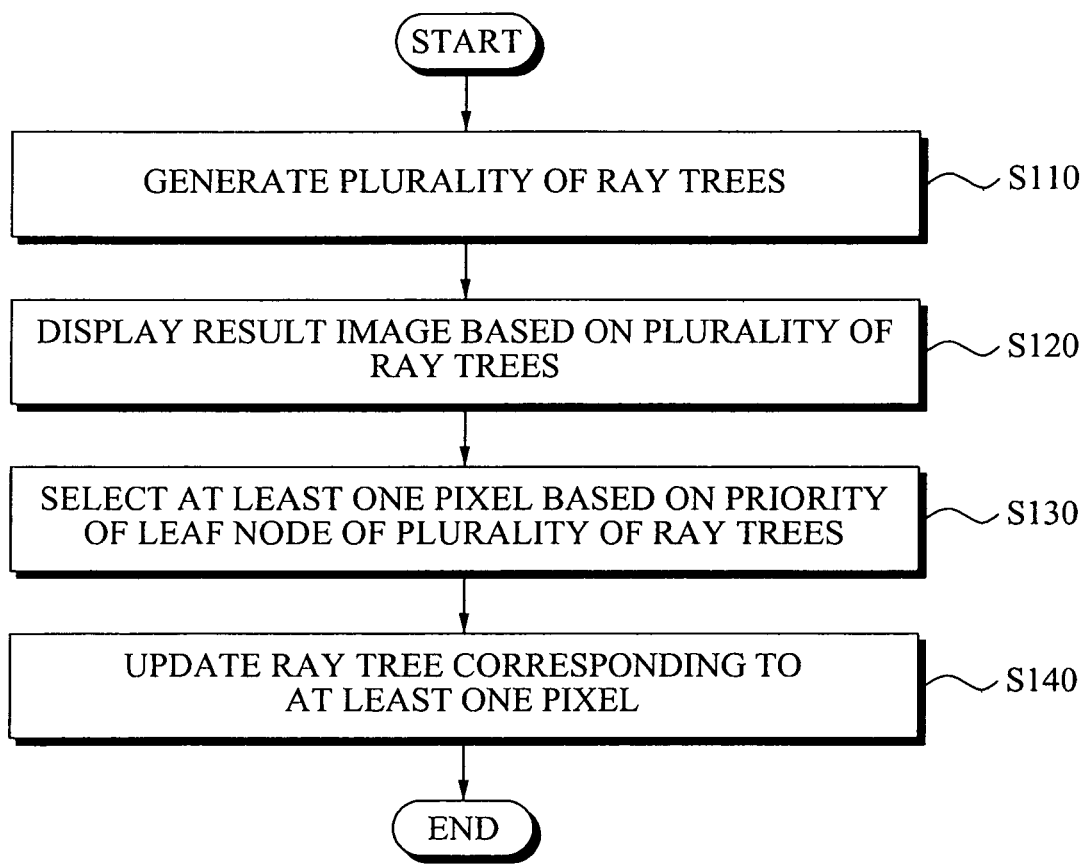
FIG. 1 is a block illustration of three-dimensional (3D) image processor and processing method operations, according to an embodiment of the present invention.

Reference will now be made in detail to embodiments, examples of which are illustrated in the accompanying drawings, wherein like reference numerals refer to the like elements throughout. The embodiments are described below to explain the present invention by referring to the figures.

FIG. 1 is a block illustration of three-dimensional (3D) image processor and processing method operations, according to an embodiment of the present invention.

In operation S110, a plurality of ray trees may be generated to a first depth or level. Each ray tree may respectively correspond to a particular pixel of a plurality of pixels that make up or can make up an image. The image derived from the ray trees is considered a 'result image', i.e., the image representing a viewing of an object space from a particular viewpoint; the generating of this result image for this viewpoint is a 'rendering' of the result image. The plurality of ray trees may be generated based on a number of pixels corresponding to a resolution of the image. According to an embodiment, for example, the first depth may correspond to a depth 1, of the plurality of ray trees generated by single checking for collisions of rays, i.e., 'collision checking', from each of the plurality of pixels included in the image with respect to an object. Further, according to an embodiment, for example, the first depth may correspond to a depth (of at least two) of the plurality of ray trees generated by checking at least twice for collisions of rays from each of the plurality of pixels with respect to an object. Additional depths may be determined, as explained below.

Further, according to an aspect of the present invention, in a collision check, a collision point where a ray collides with an object during a ray tracing process is calculated. In the collision check, regarding the progression of the ray, may include a deriving of a color value based on direct illumination upon a collision, a reflection coefficient based on reflection for a collision point, a transmission coefficient based on transmission for a collision point, a starting point of a corresponding reflection ray (and/or transmission ray) for a collision point, information about any corresponding ray direction, and the like. In this instance, hereinafter, refraction may be referred to as transmission.

In operation S120, a result image may be displayed based on the plurality of ray trees corresponding to each of the plurality of pixels. The plurality of ray trees may, for example, generated to the first depth. According to an embodiment of the present invention, the result image may be displayed based on a color value calculated by only checking collisions of primary rays during the ray tracing process. The 'primary rays' originates from a pixel or a viewer's viewpoint.

In operation S130, at least one pixel of the plurality of pixels may be selected for processing based on a priority of a leaf node of the plurality of ray trees. Here, a ray tree with a higher priority may be processed first and additionally updated from among the plurality of ray trees. According to an embodiment, for example, a priority of a ray tree corresponding to a pixel associated with a glossy part of an object may be high. Similarly, for example, a priority of a ray tree where a leaf node has a shallow depth may be higher than other trees among the plurality of ray trees. As another example, a ray where a small number of reflections and/or small number of transmissions occur may be significant in ray tracing, since the direct illumination from the corresponding collision point may be reduced as the result image for the corresponding pixel may be significantly affected as the number of reflections and/or transmissions increases. The priority may be determined based on whether the pixel falls within a particular Region of Interest (ROI). The ROI may represent a division of the image into critical portions when weighing the desired a quality of the result image in a specific region. Ray tracing may be first performed with respect to a region with a high ROI, and thereby may improve a quality of 3D rendering performed for a same time period. In addition, the priority may be determined based on at least one of a temporal change rate of color values of the plurality of pixels, a spatial change rate, and a distance between the pixel corresponding to the leaf node and a collision point, for example.

In operation S140, a ray tree corresponding to the at least one pixel may be updated, e.g., more finely defined, to a second depth. Child nodes of a leaf node of the ray tree corresponding to the at least one pixel may, thus, be generated by checking additional collisions.

Figure 2:
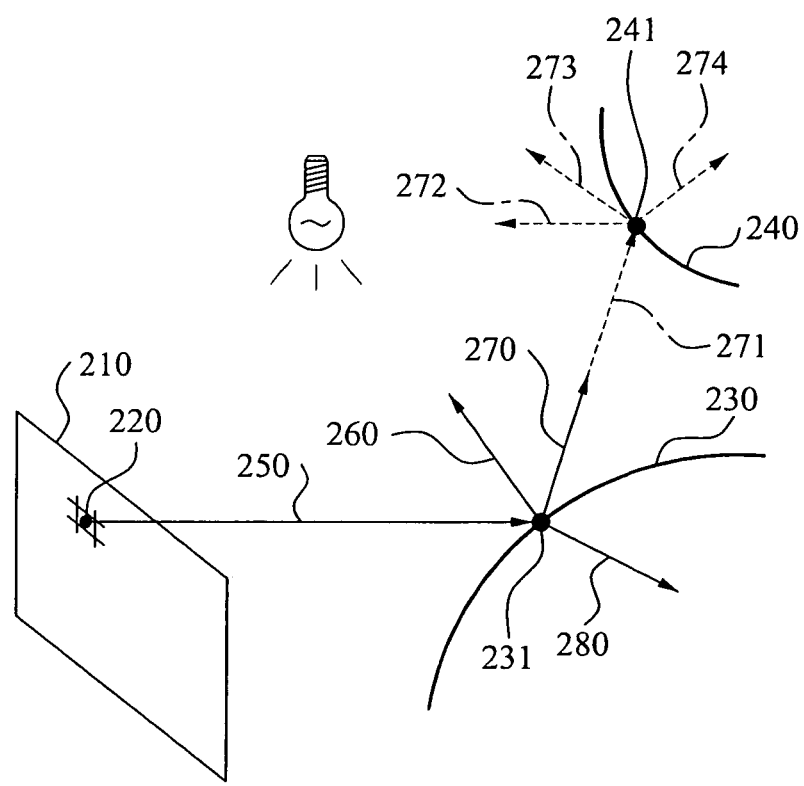
FIG. 2 illustrates a ray tracing example, according to an embodiment of the present invention.

FIG. 2 illustrates a ray tracing example, according to an embodiment of the present invention.

An image 210, e.g., for the viewpoint of a user, to be rendered includes a plurality of pixels. A ray 250 is projected from a pixel 220 of the plurality of pixels, e.g., toward object 230, with objects 230 and 240 being located in object space. When checking a collision of the ray 250, the ray 250 collides with the object 230 at a point 231. The illustrated ray 260 corresponds to the 'direct illumination' of a set light source 290, such as a virtual light source, the illustrated ray 270 corresponds to the reflection off of object 230, and the illustrated ray 280 corresponds to the transmission into object 230.

When checking a next collision of the ray 270, the illustrated ray 271 (extended from the ray 270) collides with the object 240 at a point 241. Here, the illustrated ray 272 again corresponds to the direct illumination of the light source 290, the illustrated ray 273 corresponds to the reflection off of object 240, and the illustrated ray 274 corresponds to the transmission into object 240. Although two collisions have been shown as being checked in FIG. 2, additional collision checks may also be performed, according to a setting, for example.

Figure 3:
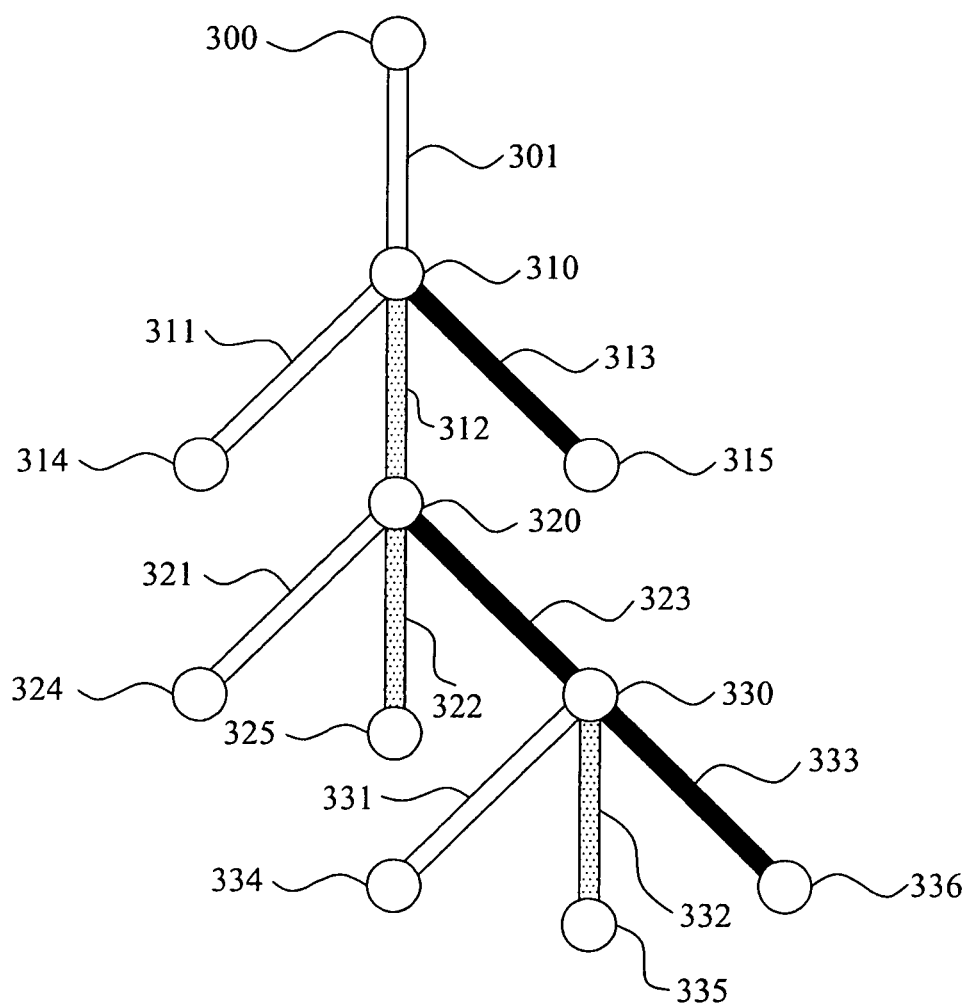
FIG. 3 illustrates a ray tree generated by a ray tracing, such as the ray tracing of FIG. 2, according to an embodiment of the present invention.

FIG. 3 illustrates a ray tree generated by a ray tracing, such as the method of FIG. 2, according to an embodiment of the present invention.

According to an embodiment of the present invention, the illustrated node 300 corresponds to a 'root pixel', like the pixel 220 of FIG. 2. A ray starts at the root pixel, for example, ray 301 corresponds to the ray 250 that starts from the pixel 220. The ray 250 that starts from the pixel 220 is considered the 'primary ray'. The illustrated node 310 corresponds to the point 231 of FIG. 2. Accordingly, as a result of checking a collision of the ray 301, a node 314 based on direct illumination ray 311 of the light source 290, a node 320 based on reflection ray 312, and a node 315 based on transmission ray 313 may be generated. An operation of generating of the node 314, node 320, and node 315 may correspond to an operation of calculating the direct illumination ray 260, reflection ray 270, and transmission ray 280, e.g., as a result of the collision check of the ray 250 in FIG. 2.

According to an embodiment of the present invention, the node 314 may correspond to a color value based on the direct illumination ray 311. The color value may be calculated based on an angle (not illustrated) between an incident direction of the ray and a surface of the object 230, an intensity and/or color of the light source 290, surface information (e.g. texture) of the object 230, and the like. Accordingly, when checking a collision from the pixel 220 corresponding to the node 300 only once, a color value of the pixel 220 may be calculated based on the node 314.

The node 320 may include information about a reflection coefficient, with the reflection coefficient being determined based on information about the surface of the object 230, for example. The information may be a color, reflection amount, and the like, and the reflection coefficient may be between 0 and 1, as a further example. Here, a reflection coefficient of a non-glossy surface may, thus, be close to 0, and a reflection coefficient of a glossy surface such as a mirror may be more close to 1.

The node 315 may include information about a transmission coefficient, with the transmission coefficient being determined based on the information about the surface of the object 230, for example. The information may be a transparency, refractive index, and the like, and the transmission coefficient may be between 0 and 1, as a further example. Here, a transmission coefficient of a non-transmitting surface may, thus, be close to 0, and a transmission coefficient of a transmitting surface such as a transparent glass may be more close to 1.

According to an embodiment of the present invention, a subsequent collision may be checked based on a result of the previous collision checking operation. Since the node 314 corresponds to the direct illumination ray 311, the node 314 may not generate a child ray. However, since the node 320 and node 315 correspond to reflection and transmission rays, respectively, the node 320 and node 315 may generate respective child rays depending on an object surface. As an example, when the object 230 of FIG. 2 does not transmit light but reflects light, and the transmission coefficient is close to 0, child rays 322 and 323 of the node 320 are generated as illustrated in FIG. 3. However, a child ray of the node 315 is shown as not being generated. A ray 321 of FIG. 3 corresponds to the direct illumination (e.g., the ray 272 of FIG. 2), the ray 322 corresponds to the reflection (e.g., the ray 273 of FIG. 2), and the ray 323 corresponds to the transmission (e.g., the ray 274 of FIG. 2). In this example, the node 324 corresponds to a color value based on direct illumination at the point 241 of the object 240. The color value based on the direct illumination corresponding to the node 324 may, thus, be used to update a color value of the pixel 220.

According to an embodiment of the present invention, the color value based on the direct illumination corresponding to the node 324 may be multiplied by a reflection coefficient corresponding to the node 320, to update the color value of the pixel 220. As shown, the node 320 is a parent node of the node 324. Accordingly, the color value of the pixel 220 may be obtained by summing the color value based on the direct illumination corresponding to the node 314 and the value calculated by multiplying the color value based on the direct illumination corresponding to the node 324 and the reflection coefficient corresponding to the node 320.

Only node 330 of nodes 324, 325 and 330, corresponding to a depth 2, may have child rays, with a reflection coefficient 325 being close to 0 and a transmission coefficient 330 being equal to or greater than a predetermined reference at the point 241 of the object 240 illustrated in FIG. 2. When further checking of collisions for the ray 274 are performed, the ray 274 may collide with another object not illustrated. In this instance, a node 334 corresponding to direct illumination ray 331, a node 335 corresponding to reflection ray 332, and a node 336 corresponding to transmission ray 333 may be further calculated. The color value of the pixel 220 may be further updated with a value obtained by summing the color value of the pixel 220, resulting from the checking of collisions for the ray 274, and a value calculated by multiplying a color value based on the direct illumination corresponding to the node 334 and a transmission coefficient corresponding to the node 330.

According to an embodiment, a ray coefficient, that is, a reflection coefficient and transmission coefficient, corresponding to nodes of the depth 2 may be obtained by multiplying ray coefficients corresponding to an ancestor node of the nodes of the depth 2. For example, a reflection coefficient of the node 330 may be obtained by multiplying a reflection coefficient corresponding to the node 310, a transmission coefficient corresponding to the node 320, and a reflection coefficient of the reflection ray 332. In addition, the transmission coefficient of the node 330 may be obtained by multiplying a reflection coefficient corresponding to the node 310, a transmission coefficient corresponding to the node 320, and a transmission coefficient of the transmission ray 333.

Figure 4:
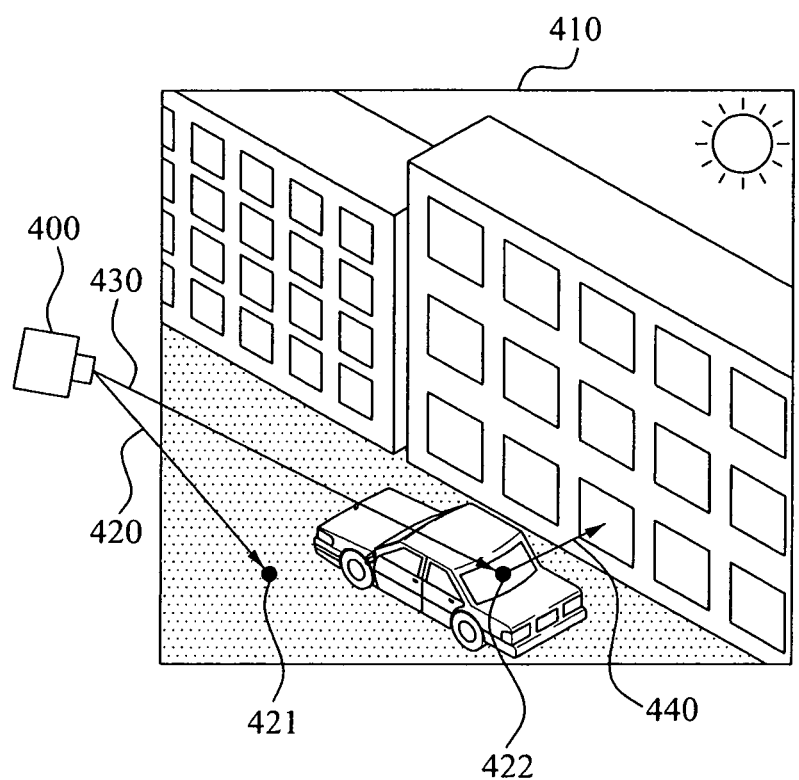
FIG. 4 illustrates a 3D image data example describing a priority for ray tracing, according to an embodiment of the present invention.

FIG. 4 illustrates a 3D image data example describing a priority for ray tracing, according to an embodiment of the present invention.

According to an embodiment, an image 410 is a result image based on a ray tracing 3D rendering scheme. A ray 430 is generated from a virtual camera 400. A point 422 where the ray 430 collides with an object is a glossy back glass of a car. In this example, the back glass of the car may reflect other objects well, and thus such a glossy point may have a high Level of Detail (LOD) in terms of ray tracing. Conversely, a point 421 where a ray 420 collides with another object may be a diffusive ground surface. Such a diffusive part may have a low LOD in terms of ray tracing. Accordingly, since the ray 430 of rays generated from the camera 400 has a higher LOD than the ray 420, a child ray 440 of the ray 430 may be given priority and required to be calculated prior to a child ray (not illustrated) of the ray 420. An efficiency of ray tracing may be improved by considering the priority between the generation of further respective rays or child rays.

Figure 5:
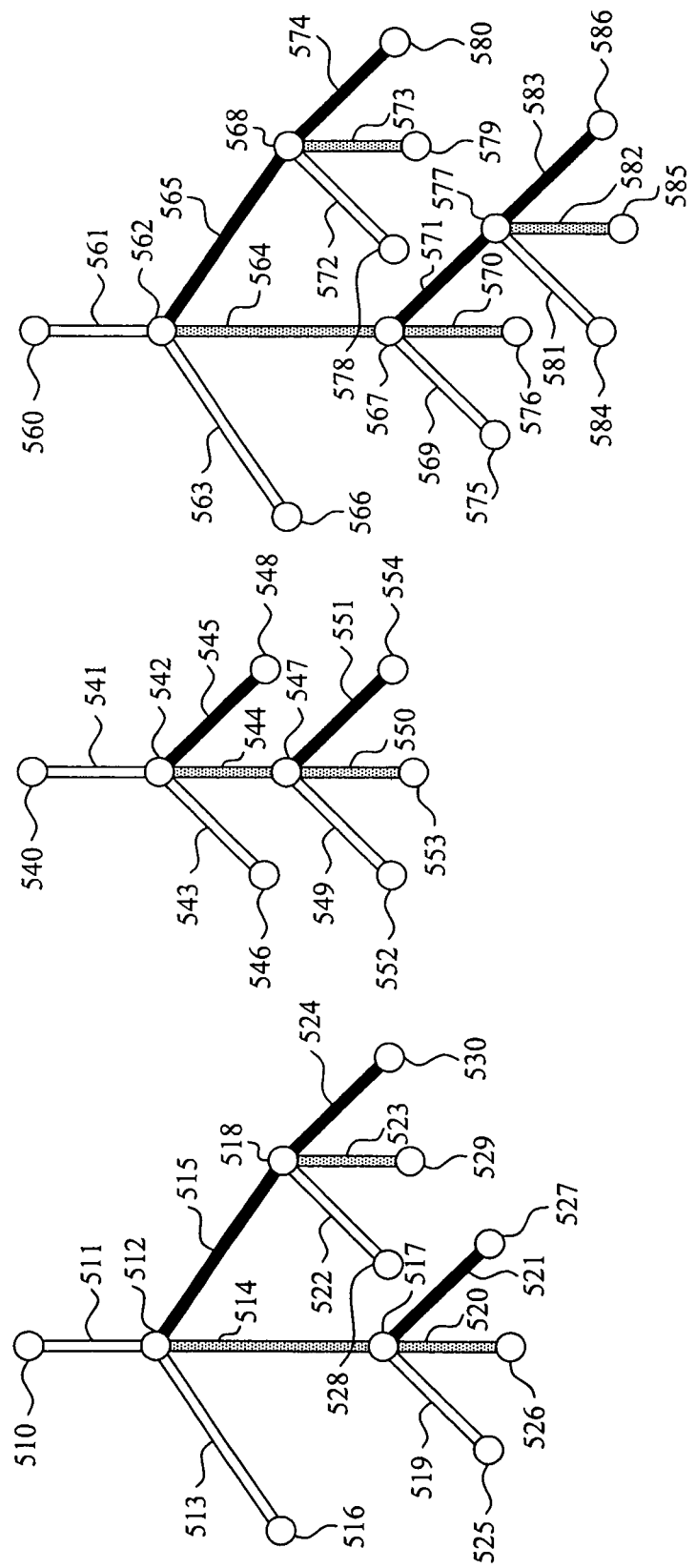
FIG. 5 illustrates three example ray trees for demonstrating a priority for the ray tracing based on a depth of leaf nodes, according to an embodiment of the present invention.

FIG. 5 illustrates three example ray trees for demonstrating a priority for the ray tracing based on a depth of leaf nodes, according to an embodiment of the present invention. Although these three ray trees are corresponding to three pixels included in an image, the three ray trees may be a portion of a plurality of ray trees corresponding to a plurality of pixels included in the image, for example.

The node 510 corresponds to information about a root pixel of a ray tree associated with the node 510, the ray 511 is a primary ray starting from the root pixel, and the node 512 corresponds to a first collision point of the ray 511. A color value for node 516, based on direct illumination ray 513 is generated as a result of a first collision of the ray 511. The color value of node 516 may become a color value of the root pixel. In addition, the child rays 514 and 515 of the ray 511 may be generated. The ray 514 corresponds to reflection and the ray 515 corresponds to transmission. The node 517 corresponds to a point where the ray 514, a reflection ray, subsequently collides, and the node 518 corresponds to a point where the ray 515, a transmission ray, subsequently collides. A color value 525 based on direct illumination ray 519 may be generated as a result of subsequent collision of the ray 514. Further, a ray coefficient corresponding to the node 517 may be multiplied by the color value 525, with the result being summed with the color value of the root pixel. Accordingly, the color value of the root pixel may be further updated. Child rays 520 and 521 of the ray 514 may also be generated. The ray 520 corresponds to reflection and the ray 521 corresponds to transmission. A color value of node 528, based on direct illumination ray 522, may be generated as a result of subsequent collision of the ray 515. A ray coefficient corresponding to the node 518 may be multiplied by the color value of node 528, with the result being summed with the color value of the root pixel. Accordingly, the color value of the root pixel may still further be updated. Child rays 523 and 524 of the ray 515 may be generated. The ray 523 corresponds to reflection and the ray 524 corresponds to transmission. Here, when checking subsequent collisions, nodes 526, 527, 529, and 530 correspond to each collision point.

Similarly, the node 540 corresponds to information about a root pixel of a ray tree associated with the node 540, the ray 541 is a primary ray starting from the root pixel, and the node 542 corresponds to a first collision point of the ray 541. A color value of node 546, based on direct illumination ray 543, is generated as a result of a first collision of the ray 541. The color value of node 546 may become a color value of the root pixel. In addition, child rays 544 and 545 of the ray 541 may be generated. The ray 544 corresponds to reflection and the ray 545 corresponds to transmission. the node 547 corresponds to a point where the ray 544 subsequently collides. A color value of node 552, based on direct illumination ray 549, may be generated as a result of subsequent collision of the ray 544. A ray coefficient corresponding to the node 547 may be multiplied by the color value of node 552, with the result being summed with the color value of the root pixel. Accordingly, the color value of the root pixel may be updated. Further, child rays 550 and 551 of the ray 544 may be generated, with the ray 550 corresponding to reflection and the ray 551 corresponding to transmission.

The node 560 corresponds to information about a root pixel of a ray tree associated with the node 560, the ray 561 is a primary ray starting from the root pixel, and the node 562 corresponds to a first collision point of the ray 561. A color value of node 566, based on direct illumination ray 563, is generated as a result of a first collision of the ray 561. The color value of node 566 may become a color value of the root pixel. In addition, child rays 564 and 565 of the ray 561 may be generated. The ray 564 corresponds to reflection and the ray 565 corresponds to transmission. The node 567 corresponds to a point where the ray 564 subsequently collides, and the node 568 corresponds to a point where the ray 565 subsequently collides. A color value of node 575, based on direct illumination ray 569, may be generated as a result of subsequent collision of the ray 564. A ray coefficient corresponding to the node 567 may be multiplied by the color value of node 575, with the result summed with the color value of the root pixel. Accordingly, the color value of the root pixel may be further updated. Child rays 570 and 571 of the ray 564 may be generated. The ray 570 corresponds to reflection and the ray 571 corresponds to transmission. A color value of node 578, based on direct illumination ray 572, may be generated as a result of subsequent collision of the ray 565. A ray coefficient corresponding to the node 568 may, thus, be multiplied by the color value of node 578, with the result being summed with the color value of the root pixel. Accordingly, the color value of the root pixel may be still further updated. Child rays 573 and 574 of the ray 565 may be generated. The ray 573 corresponds to reflection and the ray 574 corresponds to transmission. A node 577 corresponds to a point where the ray 571 subsequently collides. A color value of node 584, based on direct illumination ray 581 may, thus, be generated as a result of subsequent collision of the ray 571. A ray coefficient corresponding to the node 577 may, similarly, be multiplied by the color value 584, with the result being summed with the color value of the root pixel. Accordingly, the color value of the root pixel may be updated. Child rays 582 and 583 of the ray 571 may be generated. The ray 582 corresponds to reflection and the ray 583 corresponds to transmission. Here, when checking subsequent collisions, nodes 576, 585, 586, 579, and 580 correspond to each collision point.

According to an embodiment, priority may be based on the depth of respective leaf nodes. In general, a ray corresponding a small number or amount of reflections and/or small number or amount of transmissions may be significant, as light may be reduced and a result image may be more observably affected as the number of reflections and/or transmissions increases. That is, in a ray tree structure, the priority is higher as a depth of a specific node or ray is lower. For example, the nodes 517, 518, 547, 548, 567, and 568 corresponding to a depth 1 may be more significant than the nodes 526, 527, 529, 530, 553, 554, 576, 577, 579, and 580 corresponding to a depth 2, or nodes 585 and 586 corresponding to a depth 3. Similarly, the rays 514, 515, 544, 545, 564, and 565 corresponding to the depth 1 may be more significant than the rays 520, 521, 523, 524, 550, 551, 570, 571, 573 and 574 corresponding to the depth 2, or rays 582 and 583 corresponding to the depth 3. Accordingly, a priority of a leaf node 548 may have the highest priority of leaf nodes 526, 527, 529, 530, 548, 553, 554, 576, 579, 580, 585, and 586, as having the most significant depth. In this example, since the priority for leaf node 548 is higher than these listed nodes, an additional ray tracing may be first performed in the leaf node 548 before ray tracing of the remaining listed nodes. For example, a ray tree associated with the node 540, corresponding to a root pixel, of the ray trees of FIG. 5, with its higher priority, would be required to be first updated before additional ray tracing.

According to another embodiment, a depth of the rays may be compared, a collision of a ray(s) with the most significant depth may initially be checked, before other depths, and ray tracing then performed.

Figure 6:
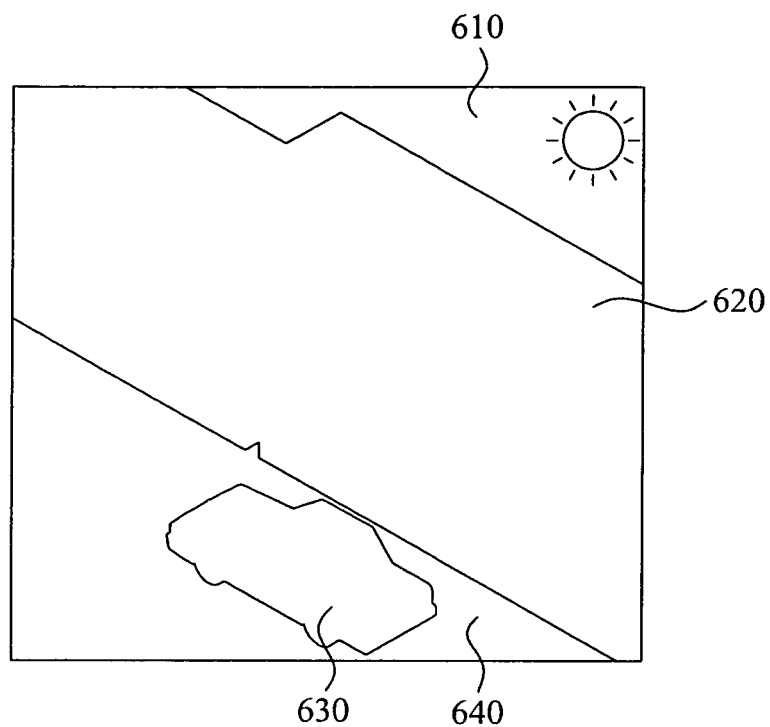
FIG. 6 illustrates a 3D image data example for demonstrating a priority for ray tracing based on a Region of Interest (ROI), according to an embodiment of the present invention.

FIG. 6 illustrates a 3D image example for demonstrating a priority for the ray tracing based on an ROI, according to an embodiment. The ROI may be a reference or indication to partition an image according to critical portions when evaluating a quality of result image of a specific region. According to an embodiment, ray tracing is first performed with respect to a region with a high ROI, and thereby may improve a quality of 3D rendering performed for a same time period.

The illustrated regions 610, 620, 630, and 640 correspond, respectively, to a sky, building, car, and ground in the image 410 of FIG. 4. If the region 630 includes glossy portions, like the point 422 of FIG. 4, and thereby potentially reflect other objects well, such a region 630 may have a high LOD in terms of ray tracing and priority of the region 630 may be high. Conversely, the priority may be low for the region 640 if it includes diffusive portions, like the point 421 of FIG. 4. Similarly, a priority of the region 610 may be low. Here, in this example, the region 620 may include glossy surfaces such as a window made of glass, and thus a priority of the region 620 may be higher than the region 640 or region 610.

According to an embodiment, the ROI may be determined based on external or predetermined data. A region with a higher priority based on the ROI with respect to a purpose or characteristic of an image to be 3D rendered, contents, and the like, may be determined based on such external or predetermined data.

According to another embodiment, the ROI may be calculated based on a physical characteristic in an image of a specific region. For example, the ROI may be higher as a region to be 3D rendered is close to a center of the image, and the ROI may be lower as a region to be 3D rendered is close to an edge of the image.

Figure 7:
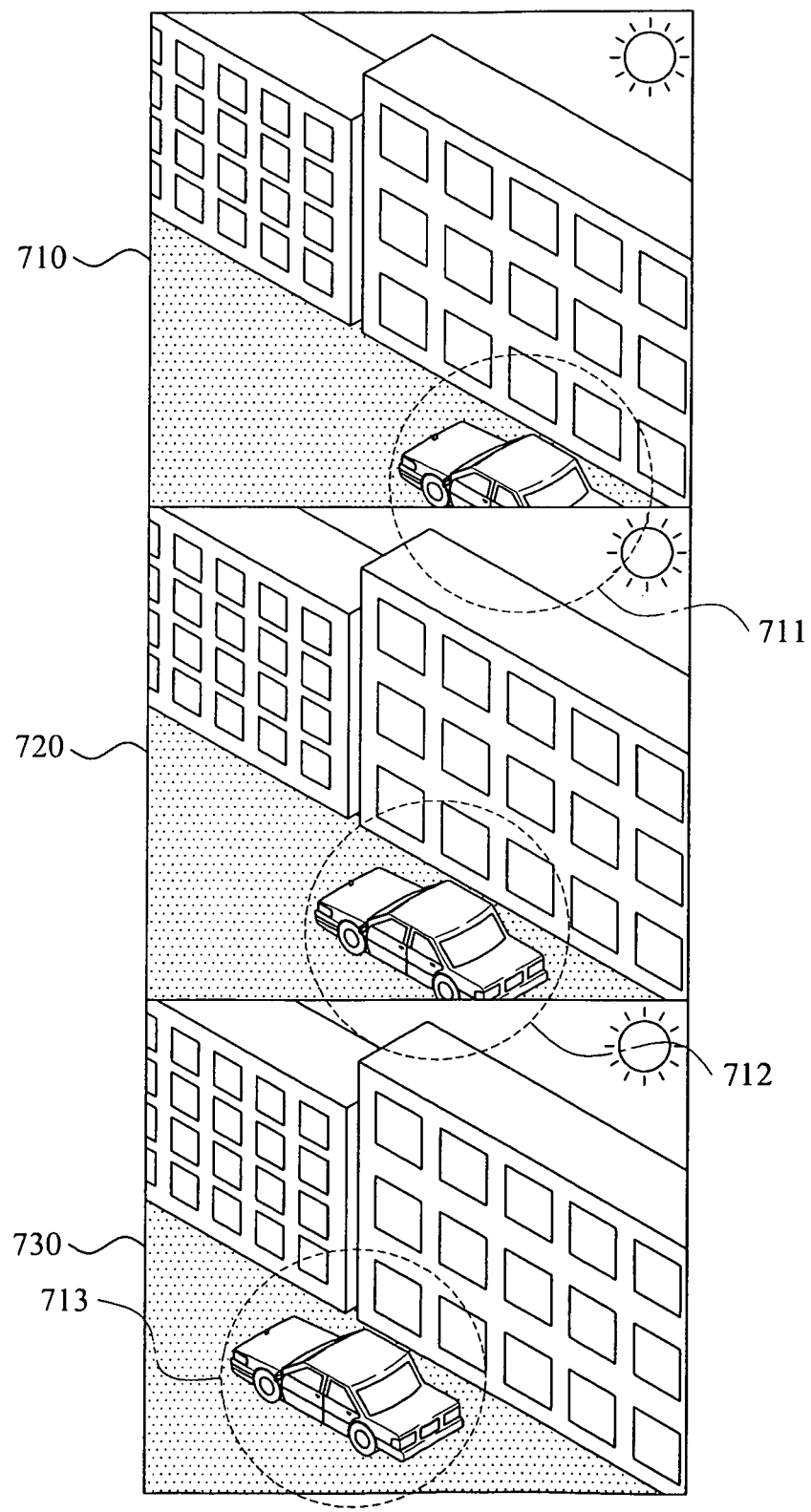
FIG. 7 illustrates a 3D image data example for demonstrating a priority for ray tracing based on a distance from a pixel to a collision point, a temporal change rate, or a spatial change rate, according to an embodiment of the present invention.

FIG. 7 illustrates a 3D image example for demonstrating a priority for the ray tracing based on a distance from a pixel to a collision point, temporal change rate, or spatial change rate, according to an embodiment of the present invention.

In the illustrated frame 710, frame 720, and frame 730, frames change only in regions 711, 712, and 713 where the vehicle is located, such that a pixel value of a current frame and that of a previous frame with respect to remaining regions excluding the regions 711, 712, and 713 may be identical. Thus, according to an embodiment, a pixel or region where a color value is temporally significantly changed may have a higher priority. Accordingly, ray tracing may not be repeatedly performed in the remaining regions with lower priorities, and a color value of a previous frame may be first copied and stored. In addition, ray tracing may be performed in the regions 711, 712, and 713 where a temporal change rate of color values of pixels is determined to be significant.

According to an embodiment, the priority of a region where a color values of a pixel may be spatially significantly changed may be higher than that of a region where the color values of a pixel may have little change. The region where the color values of a pixel may be significantly changed may be, for example, a boundary of the regions 610, 620, 630 and 640 and the regions 620 and 630, all of FIG. 6, for example, including the vehicle or building. Further, the region where the color values of pixels may have changed little may be, for example, the regions 610 and 640 of FIG. 6 corresponding to the sky or ground.

According to another embodiment, the priority may be higher as the distance between the pixel and the collision point decreases. For example, the priority of the region 630, corresponding to the vehicle of FIG. 6, may be higher than that of the region 610 corresponding to the sky.

According to an embodiment, the priority, determined based on the distance, temporal change rate, or spatial change rate, may be calculated with respect to a region, and identically applied to all pixels included in the region. In an embodiment, the region may be a set of predetermined pixels. However, according to another embodiment, for example, the priority may be determined based on an individual pixel, and thereby may be applied to child rays or child nodes, e.g., when the individual pixel is a root pixel.

Figure 8:
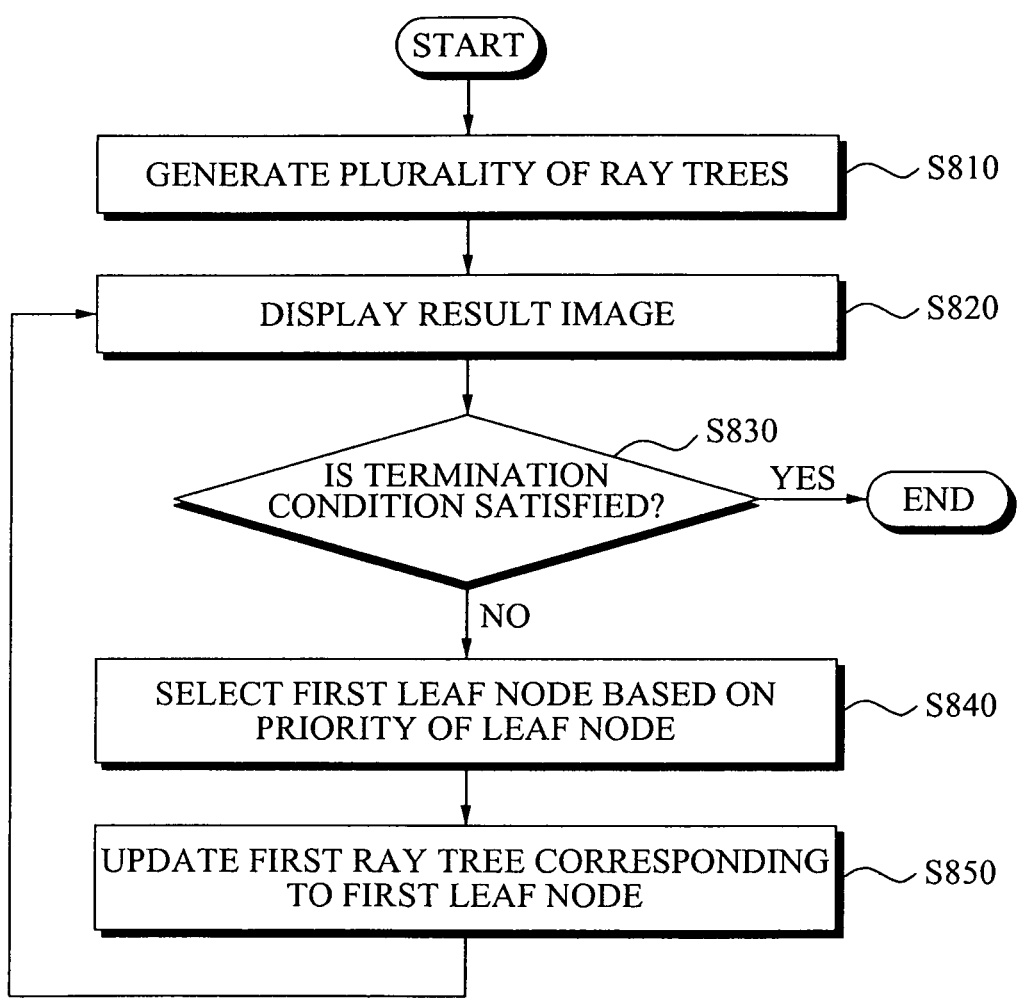
FIG. 8 is a block illustration 3D image processor and processing method operations, according to an embodiment of the present invention.

FIG. 8 is a block illustration of 3D image processor and processing method operations, according to an embodiment of the present invention.

In operation S810, a plurality of ray trees may be generated to a first depth, for example. Each ray tree can respectively correspond to a pixel of the plurality of pixels included in an image. The image may be a result image when viewing an object space in a viewpoint where the result image is to be rendered. For example, the plurality of ray trees may be generated based on a number of pixels corresponding to a resolution of the image. According to an embodiment, the first depth may correspond to a depth 1 of the plurality of ray trees generated by checking once for a collision of rays from each of the plurality of pixels included in the image with respect to an object, e.g., before checking for a second collision of rays for any pixel. According to another embodiment, the first depth may correspond to a depth (at least depth two) of the plurality of ray trees generated by checking a collision of rays with respect to an object at least twice.

In operation S820, a result image is displayed. A color value of the plurality of pixels may be calculated and displayed based on the plurality of ray trees generated to the first depth. For example, when checking a collision of rays from the pixel 220 of FIG. 2, corresponding to the node 300 of FIG. 3, once, a color value of the pixel 220 may be calculated based on the node 314 based on the direct illumination ray 311.

In operation S830, it may be determined whether a termination condition has been satisfied. The termination condition may be a depth of a leaf node of the ray tree, that is, a recursive depth which is greater than a predetermined reference. According to an embodiment, an amount of time, e.g., a permitted amount of time, for ray tracing may be determined with respect to a single frame, and when the amount of time passes, an operation of the single frame may be terminated. According to another embodiment, the termination condition may be a ray coefficient less than a predetermined reference. Such a ray coefficient may correspond to the leaf node of the ray tree.

According to an embodiment, as the termination condition, such as the amount of time, may be available, a desired Frame per second (FPS) for a series of frames may be regularly maintained in ray tracing of the sequential video frames.

When the termination condition is not satisfied, a first leaf node may be determined based on a priority of a leaf node of the plurality of ray trees, in operation S840. According to an embodiment, when a depth of a leaf node is not great, the priority may be higher than leaf nodes with greater depth. In addition, a priority of a leaf node with a high ROI may be higher than leaf nodes with lower ROI. Still further, when a temporal change rate and/or spatial change rate of color values of a pixel corresponding to the first leaf node is great, the priority may be higher than leaf nodes with lower change rates.

In operation S850, a first ray tree corresponding to the first leaf node may be updated, i.e., the ray tree having the first depth may be increased to have additional leaf nodes, and thus additional collision information. Accordingly, child nodes of the first leaf node may be generated and added to the ray tree by checking an additional collision of the first leaf node.

In operation S820, the result image may further be recursively displayed using the color value of the plurality of pixels calculated based on the updated first ray tree.

According to an embodiment, after recursively performing the 3D image processing, in operations S820 through S850, and when the termination condition is satisfied, the 3D image processing may be terminated.

Figure 9:
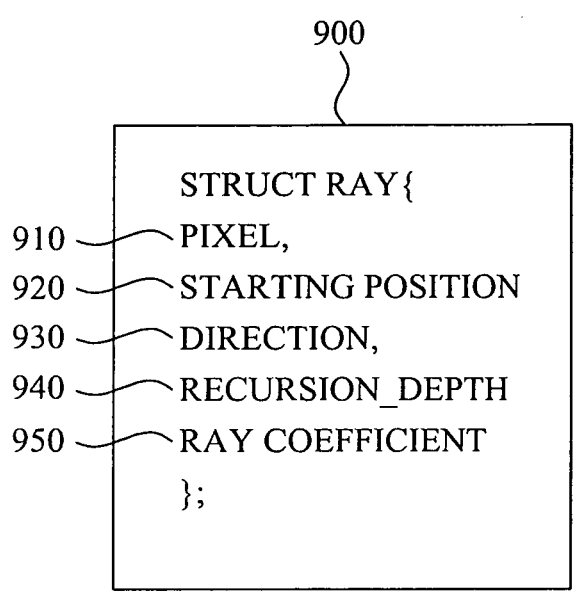
FIG. 9 illustrates pseudo code for ray data, according to an embodiment of the present invention.

FIG. 9 illustrates pseudo code for ray data, according to an embodiment of the present invention.

A configuration 900 of ray data corresponds to a storage format of the rays 312, 313, and the like of FIG. 3. In addition, the configuration 900 of ray data corresponds to a storage form of the nodes 320, 315, and the like. A data row 910 may correspond to information about a root pixel of the rays, and a data row 920 may correspond to a starting point of the ray. In addition, a data row 930 may correspond to a direction of the rays, a data row 940 may correspond to a recursion depth of the rays, and a data row 950 may correspond to a ray coefficient.

According to another embodiment, a portion of the data rows 910, 920, 930, 940, and 950 may be omitted and/or replaced with another data row (not illustrated) corresponding to another information.

Figure 10:
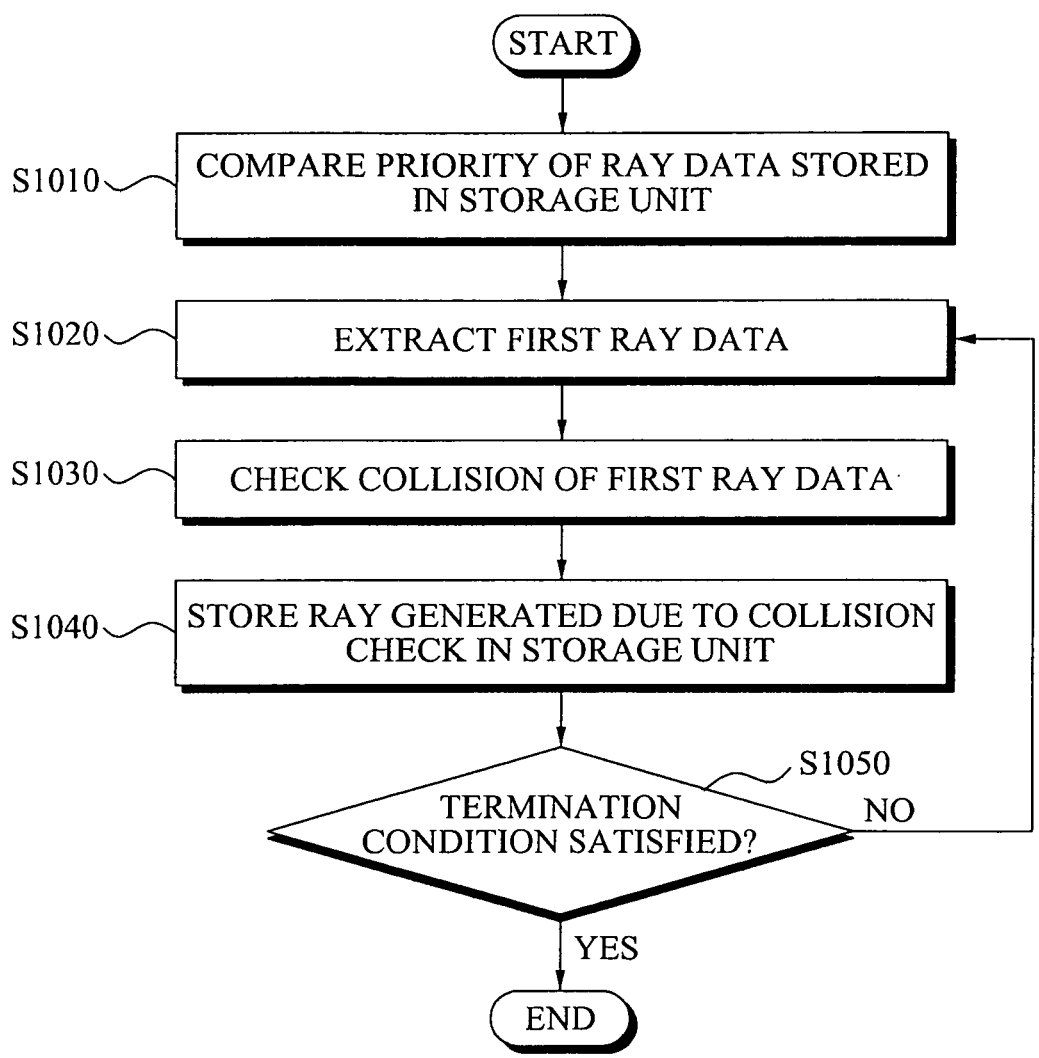
FIG. 10 is a block illustration of 3D image processor and processing method operations, according to an embodiment of the present invention.

FIG. 10 is a block illustration of 3D image processor and processing method operations, according to an embodiment of the present invention.

In operation S1010, a priority of ray data stored in a storage device may be compared. According to the this embodiment, ray data of FIG. 9, for example, may have been stored in a predetermined data storage device. According to an embodiment, the storage device may further store the ray data based on a queue structure.

The priority may be determined based on at least one of a depth, ray coefficient, ROI value of a ray, temporal change rate of a color value of a pixel associated with the ray changes, spatial change rate, and distance between the pixel and a collision point, noting that additional priority criteria would be equally available.

In operation S1020, first ray data with the highest priority may be extracted. In operation S1020, the first ray data may be loaded from the data storage device. In an embodiment, the first ray data may then be removed or further ignored in the storage device. For example, in the queue structure, the first ray data may accordingly then be de-queued.

In operation S1030, a collision of the first ray data may be checked. In the collision check in operation S1030, a subsequent collision of an object may be calculated based on the starting point 920 and direction 930 of the first ray data, a color value of the root pixel 910 may be updated, and a data configuration 900 of child rays (not illustrated) of the first ray may be generated.

In operation S1040, the child rays generated by the collision check may be stored in the storage device. In the queue structure, the child rays may be re-queued.

In operation S1050, it is determined whether a termination condition is satisfied. The termination condition may be a recursive depth (data row 940 of FIG. 9) of the ray data which is greater than a predetermined reference. According to an embodiment, an amount of time for ray tracing may be determined with respect to a single frame, and when the amount of time passes, an operation of the single frame may be terminated. According to another embodiment, the termination condition may be a ray coefficient (data row 950) less than a predetermined reference. In this example, the ray coefficient could correspond to a leaf node of the ray tree.

According to an embodiment, using the termination condition, such as the time out may be available, a FPS may be regularly maintained in ray tracing of sequential video frames.

When the termination condition is not satisfied, a priority of the ray data stored in the storage device in operation S1010 may be further compared. After recursively performing the 3D image processing in operations S1010 through S1050, when the termination condition is satisfied, the 3D image processing may then be terminated.

Figure 11:
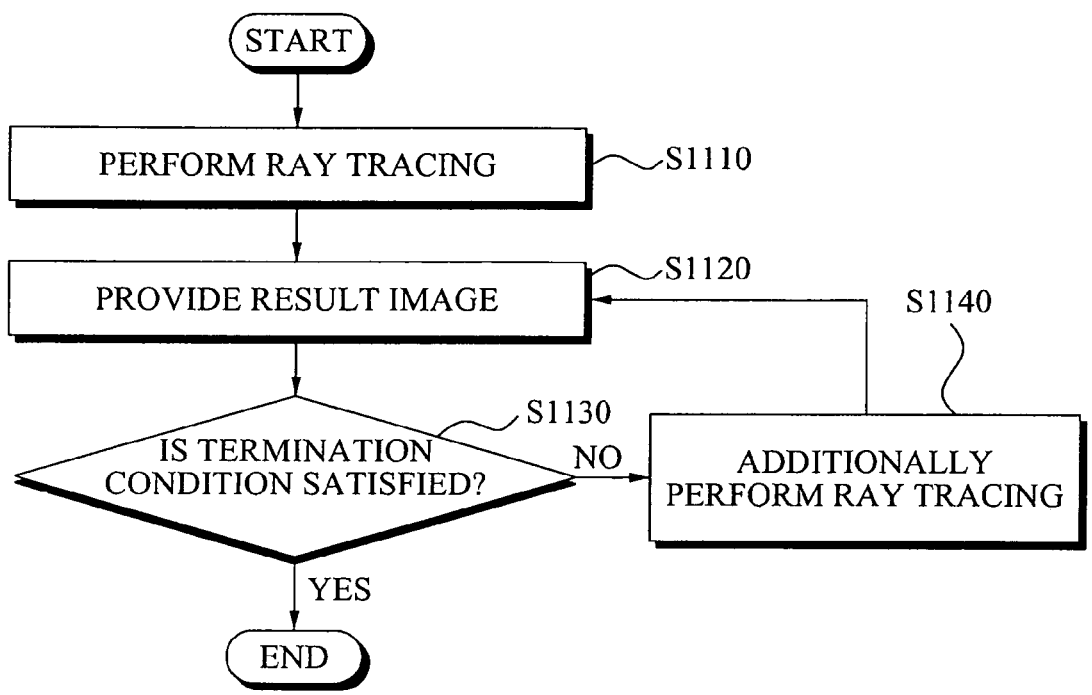
FIG. 11 is a block illustration of 3D image processor and processing method operations, according to an embodiment of the present invention.

FIG. 11 is a block illustration of 3D image processor and processing method operations, according to an embodiment of the present invention.

In operation S1110, ray tracing may be performed to a first depth. According to an embodiment, a child ray data configuration and a color value of a primary ray, for example, the ray 250 of FIG. 2, from a plurality of pixels included in an image may be generated, in operation S1110.

In operation S1120, a result image may be provided. The result image may be displayed based on the color value of the plurality of pixels calculated by ray tracing to the first depth.

In operation S1130, it may be determined whether a termination condition has been satisfied. The termination condition may be a recursive depth (e.g., data row 940 of FIG. 9) of ray data being greater than a predetermined reference. According to an embodiment, an amount of time allotted for of ray tracing may be determined with respect to a single frame, and when the amount of time passes, an operation of the single frame may be terminated. According to another embodiment, the termination condition may be a ray coefficient (e.g., data row 950) being less than a predetermined reference. The ray coefficient may correspond to a leaf node of a ray tree.

When the termination condition is not satisfied, ray tracing may be additionally performed to a second depth with respect to at least one pixel, in operation S1140. In addition, a result image may be provided based on a result of ray tracing to the second depth, in operation S1120.

When the termination condition is satisfied in operations S1110, S1120, S1130, and S1140, the 3D image processing may be terminated.

The 3D image processing method operations, according to the above-described embodiments, may be recorded in computer-readable media including program instructions to implement various operations embodied by a computer; noting that embodiments of the present invention include such a processor configured to similarly implement embodiments of the invention. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A three dimensional (3D) image processing method using ray tracing, the 3D image processing method comprising:
    generating a plurality of ray trees to a first depth, each ray tree corresponding to a respective pixel of a plurality of pixels for an image, by checking a collision of rays, each ray corresponding to the respective pixel of the plurality of pixels; and
    selectively updating at least one generated ray tree, among the generated plurality of ray trees, from the first depth to a second depth when a collision of corresponding rays derived from the respective ray used to generate the corresponding at least one generated ray tree to the first depth satisfies a predetermined priority condition,
    wherein the predetermined priority condition is determined based on at least one of a depth of a leaf node, a ray coefficient corresponding to the leaf node, and a Region of Interest (ROI) associated with one pixel corresponding to the leaf node, and
    wherein the updating is selective in that additional collisions of the rays are checked for generated ray trees satisfying the predetermined priority condition prior to checking additional collisions of rays in generated ray trees that do not satisfy the predetermined priority condition.

2. The 3D image processing method of claim 1, further comprising:
    displaying a result image based on the plurality of ray trees to the first depth before a displaying of a result image based on the updating of the at least one generated ray tree to the second depth.

3. The 3D image processing method of claim 1, wherein the selectively updating of the at least one generated ray tree updates the at least one generated ray tree, such that a collision is checked for a child ray of the respective ray prior to checking a collision of a child ray of a different ray, based on the predetermined priority.

4. The 3D image processing method of claim 1, wherein the generating of the plurality of ray trees to the first depth comprises checking a first collision of rays from the respective pixel, and
    wherein the selective updating comprises updating the plurality of ray trees at the first depth to the second depth, the second depth indicating a next collision of a child ray generated from the first collision, when the predetermined priority condition is satisfied.

5. The 3D image processing method of claim 1, further comprising updating a color value of a root pixel, corresponding to the respective pixel from which a primary ray is cast, by multiplying a color value of a child node with a reflection coefficient of a parent node.

6. The 3D image processing method of claim 1, wherein the ray trees are generated such that depths of the ray trees correspond to subsequent intersections of the respective ray, cast from the respective pixel, and object surfaces.

7. A non-transitory computer-readable recording medium having stored thereon instructions to implement a 3D image processing method using ray tracing, the instructions comprising:
    an instruction set of generating a plurality of ray trees to a first depth, each ray tree corresponding to a respective pixel of a plurality of pixels for an image, by a comprised instruction set of checking a collision of rays, each ray corresponding to the respective pixel of the plurality of pixels; and
    an instruction set of selectively updating at least one generated ray tree, among the generated plurality of ray trees, from the first depth to a second depth when a collision of corresponding rays derived from the respective ray used to generate the corresponding at least one generated ray tree to the first depth satisfies a predetermined priority condition,
    wherein the predetermined priority condition is determined based on at least one of a depth of a leaf node, a ray coefficient corresponding to the leaf node, and a Region of Interest (ROI) associated with one pixel corresponding to the leaf node, and
    wherein the updating is selective in that additional collisions of the rays are checked for generated ray trees satisfying the predetermined priority condition prior to checking additional collisions of rays in ray trees that do not satisfy the predetermined priority condition.

8. The computer-readable recording medium of claim 7, further comprising:
    an instruction set of displaying a result image based on the plurality of ray trees to the first depth before a displaying of a result image based on the updating of the at least one generated ray tree to the second depth.

9. The computer-readable recording medium of claim 7, wherein the instruction set of selectively updating comprises:
    an instruction set of selecting one pixel corresponding to the at least one generated ray tree based on a determined priority of a leaf node corresponding to the at least one ray tree; and
    an instruction set of checking a collision of rays of the one pixel for the leaf node and updating the at least one generated ray tree corresponding to the one pixel to a second depth based on the collision checking of the one pixel.

10. The computer-readable recording medium of claim 9, wherein the priority is determined based on a Region of Interest (ROI) associated with the one pixel corresponding to the leaf node.

11. The computer-readable recording medium of claim 9, wherein the priority is determined based on at least one of a temporal change rate, where a color value corresponding to the leaf node changes according to a change of frame, a spatial change rate of the color value corresponding to the leaf node in a same frame, and a distance between the pixel corresponding to the leaf node and a collision point.

12. A non-transitory computer-readable recording medium having stored thereon instructions to implement a 3D image processing method using ray tracing, the instructions comprising:
   an instruction set of generating a plurality of ray trees to a first depth, each ray tree corresponding to a respective pixel of a plurality of pixels for an image, by a comprised instruction set of checking collision of rays, each ray corresponding to the respective pixel of the plurality of pixels selectively performing; and
   an instruction set of recursively performing an instruction set that selects a first leaf node when the first leaf node satisfies a predetermined priority of leaf nodes of the plurality of ray trees, checks additional collisions of rays corresponding to a pixel corresponding to the first leaf node, as a first pixel, and updates a generated ray tree corresponding to the first pixel from the first depth to a second, as an updated first ray tree,
   wherein the predetermined priority is determined based on at least one of a depth of a leaf node, a ray coefficient corresponding to the leaf node, and a Region of Interest (ROI) associated with one pixel corresponding to the leaf node, and
   wherein the checking of additional collisions of the rays for the updated first ray tree is performed prior to checking additional collisions of rays for generated ray trees that do not satisfy the predetermined priority.

13. The computer-readable recording medium of claim 12, wherein the instruction set of updating further comprises an instruction set of displaying a result image based on the updated first ray tree.

14. A non-transitory computer-readable recording medium having stored thereon instructions to implement a 3D image processing method using ray tracing, the instructions comprising:
   an instruction set of comparing predetermined priorities of a plurality of pieces of ray data stored in a storage unit;
   an instruction set of extracting first ray data from the plurality of pieces of the ray data, stored in the storage unit, when the first ray data satisfy a respective predetermined priority, among the priorities of the plurality of pieces of ray data, based on the comparing; and
   an instruction set of storing data corresponding to a reflection ray and data corresponding to a transmission ray in the storage unit, the reflection ray and the transmission ray being generated by checking additional collisions of rays of the first ray data extracted based on the priority,
   wherein the first ray data is extracted prior to extracting second ray data that does not satisfy the predetermined priority, and
   wherein the predetermined priority is determined based on at least one of a recursion depth associated with the plurality of ray data, a ray coefficient corresponding to the ray data, and a ray coefficient corresponding to the ray data.

15. The computer-readable recording medium of claim 14, wherein the priority is determined based on at least one of a temporal change rate where a color value of a pixel corresponding to the ray data changes according to a change of frame, a spatial change rate of the color value of the pixel corresponding to the ray data in a same frame, and a distance between the pixel corresponding to the ray data and a collision point.

16. A non-transitory computer-readable recording medium having stored thereon instructions to implement a 3D image processing method, the instructions comprising:
   an instruction set of providing a 3D image of a first level using a 3D rendering scheme with a plurality of quality levels; and
   an instruction set of selectively providing a 3D image of a second level after providing the 3D image of the first level when a leaf node of the first level satisfies a respective priority, among plural priorities,
   wherein the priority is determined based on at least one of a depth of a leaf node, a ray coefficient corresponding to the leaf node, and a Region of Interest (ROI) associated with one pixel corresponding to the leaf node, and
   wherein in the selective providing of the 3D image of the second level, a ray tree including the leaf node that satisfies the respective priority is checked for additional collisions of rays prior to checking additional collisions of rays for a ray tree including a leaf node that does not satisfy the priority.

17. The computer-readable recording medium of claim 16, wherein the 3D rendering scheme uses a ray tracing method.

18. The computer-readable recording medium of claim 17, wherein the 3D image of the first level is provided based on a result of generating a ray tree corresponding to each of a plurality of pixels included in an image to a first tree depth, and the 3D image of the second level is provided based on a result of selectively updating a respective ray tree corresponding to at least one pixel of the plurality of pixels to a second tree depth.

19. The computer-readable recording medium of claim 18, wherein the ray tree corresponding to the at least one pixel of the plurality of pixels is selected based on a predetermined priority of a leaf node of the respective ray tree corresponding to each of the plurality of pixels included in the image.

20. A processor configured for implementing the method of claim 1.

21. A method of rendering 3D image data through ray tracing, comprising selectively performing additional collision checking at different depths according to determined ray tree depth priorities for different pixels and/or different leaf tree nodes for a result image after performing an equal depth collision checking of all pixels in the result image,
   wherein the additional collision checking at a respective depth that satisfies a predetermined ray tree priority is performed prior to the additional collision checking at depths that do not satisfy the predetermined ray tree priority, based on the determined ray tree depth priority,
   wherein the predetermined ray tree priority is determined based on at least one of a depth of a leaf node, a ray coefficient corresponding to the leaf node, and a Region of Interest (ROI) associated with one pixel corresponding to the leaf node.

22. The method of claim 21, further comprising calculating and displaying respective pixels with color values based direct illumination, reflection, and transmission characteristics of respective collision checking for the different pixels.

23. A processor configured for implementing the method of claim 21.

24. A non-transitory computer-readable recording medium having stored thereon instructions to implement the 3D image processing method of claim 21.

* * * * *